July 11, 1961

A. C. R. HAYNES

2,992,392

MEASURING AND TESTING APPARATUS

Filed April 14, 1959

INVENTOR
Anthony Charles Rendell Haynes
BY
Watson, Cole, Grindle & Watson
ATTORNEYS

FIG. 4.

July 11, 1961 A. C. R. HAYNES 2,992,392
MEASURING AND TESTING APPARATUS
Filed April 14, 1959 6 Sheets-Sheet 3

FIG. 5.

INVENTOR
Anthony Charles Rendell Haynes
BY
Watson, Cole, Grindle & Watson
ATTORNEYS July 11, 1961　　　　A. C. R. HAYNES　　　　2,992,392
MEASURING AND TESTING APPARATUS
Filed April 14, 1959　　　　　　　　　　　　　6 Sheets-Sheet 5

INVENTOR
Anthony Charles Rendell Haynes
BY
Watson, Cole, Grindle & Watson
ATTORNEYS

… …

United States Patent Office 2,992,392
Patented July 11, 1961

2,992,392
MEASURING AND TESTING APPARATUS
Anthony Charles Rendell Haynes, Kingsbury, London, England, assignor to Haynes and Haynes Limited, London, England, a company of Great Britain
Filed Apr. 14, 1959, Ser. No. 806,264
Claims priority, application Great Britain Apr. 26, 1957
8 Claims. (Cl. 324—61)

This application for patent is a continuation in part of my co-pending patent application Serial No. 700,366, filed December 3, 1957, the specification of which is hereinafter referred to as the "parent" specification.

This invention relates to the detection and measurement of transverse dimensional variations of an elongated dielectric product, in the form for instance of tube, rod, strip or sheet.

An important application of the invention is in continuously monitoring the transverse dimensions of production runs of extruded dielectric products, more especially those made of "plastics," e.g. extruded polythene tubing.

One object of the invention is an electrical-electronic method and apparatus, in which the elongated product being examined, hereinafter called the "test product," is progressed past the plates of a so-called "measuring" capacitor so that it, or part of its cross-section, traverses the principal dielectric field of such capacitor, whose capacity is thereby varied in accordance with variations of the thickness of the product, or of that part of it which traverses the principal dielectric field of the measuring capacitor, the latter being series-connected, in a normally balanced bridge circuit energized by a radio-frequency oscillation, with a second capacitor, which is usually an adjustably variable capacitor (but may in some cases be another measuring capacitor similar to the first mentioned one as hereinafter explained) and the (oscillating) voltage, if any, on the series-connection between the two capacitors being amplified and rectified to produce a direct current, which is a measure of the amplitude of the voltage on the series-connection of the two capacitors and hence a measure of transverse dimensional variations of the test product; and such direct current being applied to a direct reading meter or, alternatively or in addition, to apparatus, not forming part of the invention, for automatically controlling the production of the product responsively to variations of the direct current above-mentioned.

As herein used, the expression "radio-frequency" means a frequency of at least 100 kc./s., but for most applications of the invention a frequency of the order of 3 mc./s. will be required.

Another object of the invention is a component unit of the above-described apparatus called by me a "detector head" and consisting essentially of a portable screening box containing the (first) measuring capacitor and the second capacitor connected in series therewith, the box having alined openings in its opposite ends to accommodate the test product and being made in two halves interconnected by a hinge with the parting between the two halves intersecting the alined openings, means being provided to hold the box closed when in use and the detector head being connected to the rest of the apparatus by flexible screened leads.

[The foregoing objects of the invention are substantially as disclosed in the parent specification.]

Further objects of the invention, not previously so disclosed, include the following:

Modified methods and apparatus enabling (a) the sign (+ or —) of dimensional variations (from a prescribed standard) of the test product to be determined directly; and (b) the magnitude and orientation of eccentricity of the bore of a continuous tubular product to be determined.

Such further objects also include alternative arrangements of measuring capacitor plates as hereinafter described.

To achieve result (a) the voltage on the series-connection of the two hereinbefore-mentioned capacitors, which voltage will differ in phase by 180° according to which capacitor has the greater capacity, may, after amplification, be applied to a phase-sensitive detecting system to produce a D.C. output, whose sign reflects the phase of its A.C. input.

However, to obviate certain difficulties in stabilizing a radio-frequency phase-sensitive detecting system, it is preferred to modulate the initial radio-frequency input of the bridge circuit at audio-frequency, to suppress the radio-frequency carrier wave, and feed the side-bands alone to the bridge circuit, with opposed phases respectively on the two series-connected capacitors, to add the carrier wave, suitably attenuated, to the voltage on the series-connection of such two capacitors, to amplify the resultant oscillation at radio-frequency, detect it at audio-frequency, amplify again at audio-frequency and apply the resultant audio-frequency oscillation to a phase-sensitive detector network, to produce a D.C. final output, whose voltage is a measure of the amplitude of the voltage on the series-connection of the two capacitors of the bridge circuit, and whose sign reflects the phase of the last-mentioned voltage.

To achieve result (b), one method is to replace the reference capacitor by a second measuring capacitor, the principal electrostatic fields of the two series-connected measuring capacitors being traversed by different, circumferentially separated parts of the wall of the tubular test product. In this way the difference of the thicknesses of two circumferentially separated parts of the wall of the tubular product can be determined. To ascertain the magnitude and orientation of any eccentricity of the bore of the tubular product, two such determinations of the difference of wall thickness of the product in different planes parallel to its axis are required; and one method of doing this is to duplicate the series-connected measuring capacitors, disposing them appropriately with respect to the test product so as to obtain two determinations of wall-thickness-difference, which can be vectorially compounded.

A preferred way of achieving object (b) is by a "scanning" method, the (single) measuring capacitor having its plates so arranged that only a (fairly small) arc of the wall of the tubular test product traverses its principal electrostatic field, and the detector head being so constructed that it can easily be rotated around the tubular test product, thus enabling the wall of the tubular test product to be scanned circumferentially by the measuring capacitor; and from the determinations of wall-thickness thus obtained the degree and orientation of the eccentricity, if any, of the bore of the test product can be determined.

How the foregoing objects, and such others as may hereinafter appear, are attained, and the nature of the invention and how it may be reduced to practice, will be more readily understood from the following description having reference to the accompanying drawings of embodiments of the invention, given by way of example only and without implied limitation of the scope of the invention, which is defined in the hereto appended claims, such embodiments comprising (a) a preferred form of the "detector head," (b) two complete circuit arrangements in which the detector head is connected, and (c) certain modified arrangements of the "measuring" capacitor.

It will be convenient first to describe the preferred detector head as illustrated in FIGURES 1 to 3 of the drawings, of which.

Figure 1:
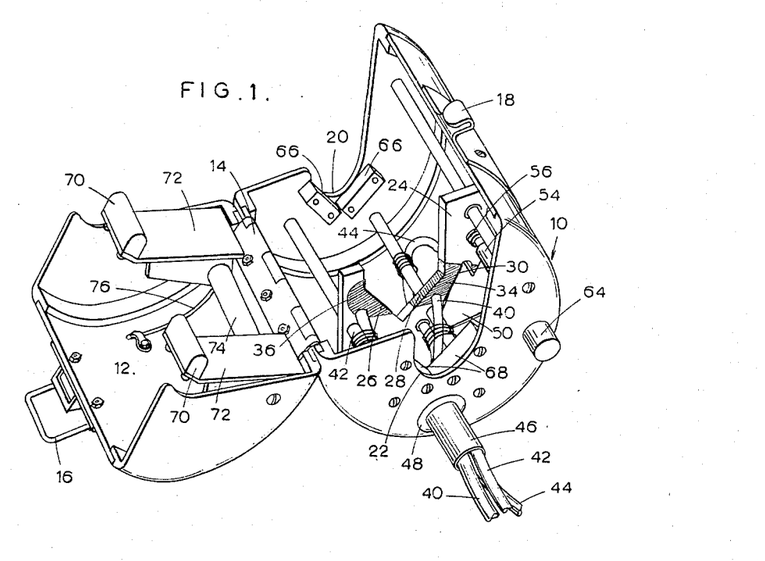
FIGURE 1 is a perspective view of the whole with the two halves of the screening box opened up.
Figure 2:
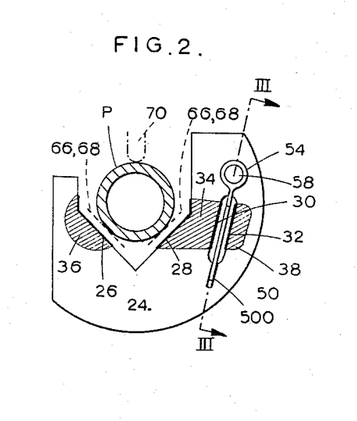
FIGURE 2 is a fragmentary detail view taken in axial section of the screen box.
Figure 3:
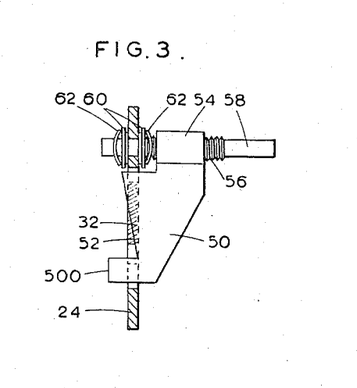
FIGURE 3 is a detail view taken in section on the line III—III of FIGURE 2.

The detector head illustrated in FIGURES 1 to 3 comprises a screening box made in two halves 10, 12 which are connected by a hinge 14 and can be latched together in the closed position by mutually engaging catches 16, 18. The flat end walls of the box have alined apertures 20, 22 for receiving the test product P (shown only in FIGURE 2). The box 10, 12 contains the "measuring" capacitor having plates 26, 28 and the "reference" capacitor having plates 30, 32, which are series-connected by a conductor 34, which connects capacitor plates 28 and 30 and to which is connected a screened lead 40, while capacitor plates 26 and 32 are respectively connected to screened leads 42, 44. The leads 40, 42, 44 are brought out of the box 10, 12 at 48 through a short rubber sleeve 46.

The capacity of the reference capacitor 30, 32 is variable (by means hereinafter described) actuated by a spindle 58 (see FIGURES 2 and 3) journalled in the (right hand) half 10 of the screening box and carrying an external operating knob 64. Means 66, 68 mounted on the end walls of the screening box adjacent the apertures 20, 22 serve to guide the test product accurately past the plates of the measuring capacitor. The apertures 20, 22 are intersected by the parting between the two halves 10, 12 of the screening box, so that when the latter is opened the test product can be inserted or withdrawn.

[The features of the detector head so far described are substantially disclosed in the parent specification. Features of the illustrated detector head which will now be described are not so disclosed.]

The illustrated detector head is adapted not only for detecting variations of mean wall thickness but also of eccentricity of a tubular test product by the scanning method mentioned above.

The screening box 10, 12 when closed, is of cylindrical shape. The apertures 20, 22 are formed by U-shaped cut-outs in the end walls of the right-hand half 10 of the screening box, the apertures being completed, when the box is closed, by the margins of the end walls of the left-hand half 12 of the box.

In the right-hand half 10 of the box is a transverse sheet 24 made of suitable, e.g. acrylic, synthetic resin. Sheet 24 has a right-angled V-shaped notch whose limbs are coated with a silver-base conductive material to form the plates 26, 28 of the measuring capacitor. Sheet 24 also has a parallel-sided slot, whose sides are similarly coated with silver-base conductive material to form the plates 30, 32 (FIGURES 2, 3) of the reference capacitor. A similar coating 34 on the face of sheet 24 electrically connects plates 28 and 30 and forms the series-connection between the measuring and reference capacitors to which is connected the lead 40. The coatings forming the plates 26 and 32 are extended along the face of sheet 24 at 36, 38 (FIGURE 2) respectively, for connection to the respective leads 42 and 44.

The capacity of the reference capacitor is variable by means of a grounded conductive trimmer plate 50 which can be advanced into and retracted from the slot in the sheet 24 whose sides carry the reference capacitor plates 30, 32. The trimmer plate 50 is accurately centered between the plates 30, 32 by an extension 500 of its lower end which has a snug sliding fit in a narrow extension of the slot of sheet 24 (see FIGURE 2). The leading edge 52 (FIGURE 3) of the trimmer plate is inclined at a small angle to the plane of sheet 24 so that the extent to which the reference capacitor plates 30, 32 are shielded by the trimmer plate increases progressively as the latter penetrates into the slot of the sheet 24. The degree of such penetration is adjustable by a nut 54 formed integrally on the trimmer plate and engaged by a screw 56 formed on the spindle 58 (FIGURES 2 and 3) which is journalled in sheet 24 and in one end wall of the right-hand half 10 of the screening box and is axially located by insulating and metal washers 60 and spring clips 62 (see FIGURE 3).

The means 66, 68 for guiding the test product P consist of V-blocks mounted on the right-hand half 10 of the screening box and preferably made of nylon loaded with molybdenum disulphide, against which the test product is held by round-faced blocks 70, preferably of polytetrafluorethylene, mounted on levers 72, which are carried by an axle 74 journalled in the end walls of the left-hand half 12 of the screening box and are loaded by springs 76 (of which one only appears in FIGURE 1). The positions of the guiding blocks 66, 68, 70 are indicated in dotted lines in FIGURE 2, which also shows the tubular test product P in position.

To facilitate disconnection and reconnection of the detector head from and to the rest of the apparatus the screened conductors 40, 42, 44 may terminate in coaxial plug- or socket-connectors.

By using light-weight materials and by careful detail design, the detector head as described with reference to FIGURES 1 to 3 can be made light enough to be supported by the test product without appreciably distorting it; and the weight of the screened leads 40, 42, 44 can be taken suspending them from a fixed support. The cylindrical shape of the detector head facilitates rotating it round the test product in carrying out the "scanning" method for determining eccentricity of the test product.

Figure 4:
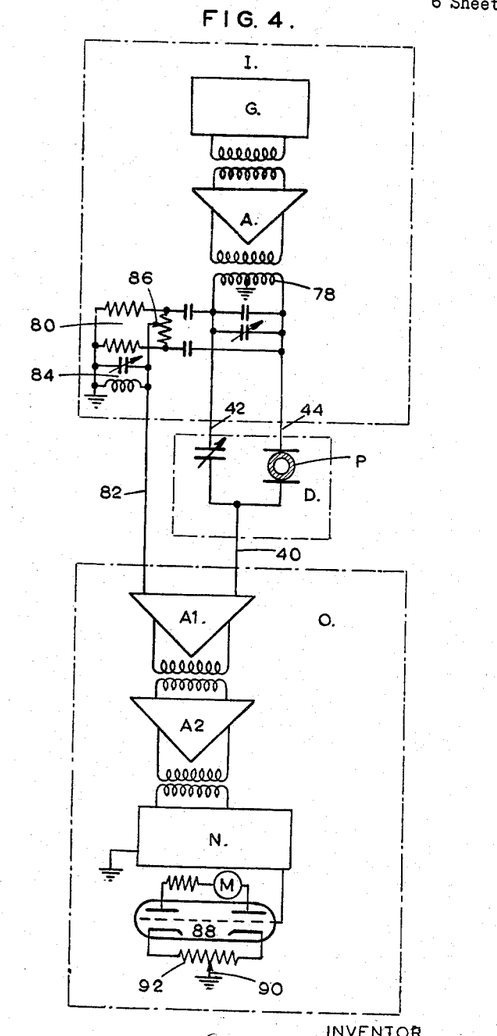
FIGURE 4 is a block diagram of certain circuit components involved in the construction and use of the novel testing apparatus and method, with partial circuit details.

One complete circuit arrangement [which is disclosed in the parent specification] is illustrated in FIGURE 4 of the accompanying drawings which is a block diagram of the circuit components with partial circuit details.

The circuit arrangement of FIGURE 4 comprises an input circuit I, the detector head D and an output circuit O including a meter M. The input circuit I comprises a radio-frequency generator G having a frequency of about 3 mc./s. and a pentode amplifying stage A loosely coupled to a coil 78. The generator G comprises a crystal controlled, grid self-biased pentode oscillator with a tuned driving circuit in its anode, heavily damped by resistance to keep its output voltage substantially constant, the driving circuit being coupled to the amplifying stage A. Coil 78 has a grounded center tapping, by which the two equal halves of coil 78 are balanced about ground. Fixed and variable capacitors are connected across coil 78, the variable capacitor serving to tune the coil to resonance with the oscillator. The opposite ends of coil 78 are respectively connected to the external screened conductors 42, 44 or the detector head (see FIGURE 1). A phase-shifting, compensating network 80, comprising equal capacity/resistance connections to ground and a bridge resistance, is connected in shunt across coil 78. An adjustable tapping 86 on the bridge resistance is connected by a screened conductor 82 to the output circuit O, and is also grounded through a tuned inductance/capacity circuit 84. The complete radio-frequency input circuit I is served by a D.C. supply accurately stabilized to a constant voltage, say 150 v.

Screened conductor 40 of the detector head D (see FIGURE 1) is connected to the output circuit O, which is served by the same stabilized D.C. supply as serves the radio-frequency input circuit I and comprises a first amplifying stage A1 having a pentode whose control grid is connected to the external conductor 40 and through a resistance to the conductor 82 and whose input is tuned by a variable inductance/capacity network. The output circuit further comprises a second amplifying stage A2 coupled to a tuned rectifying network N, the D.C. output of which is fed to the control grids of a double triode 88. The null reading meter M is connected, through a suitable resistance between the anodes of the double triode 88; and an adjustable tapping 90 on a resistance 92 joining the cathodes of the double triode 88 serves as a balance control to enable the meter M to be set to the null reading. A switch (not shown) enables the amplifying stages A1, A2 to be disconnected from the D.C. supply.

The tapping 90 is grounded through a variable resistance (not shown) which enables the current taken by the double triode for a given voltage applied to its control grids to be adjusted, in such a way, for instance, that when the last-mentioned voltage has a maximum limiting value the current through the meter M is that required for full deflection.

Considering the system as a whole, the output of coil 78 is fed, via conductors 42, 44, to the detector head, the output voltage of which is applied, via conductor 40, to the control grid of the first amplifying stage A1 of the output circuit O. Since the output voltage of coil 78 is split by the grounded center tapping, the voltages in conductors 42, 44 are equal and antiphased, so that if the capacities of the detector head are equalized by adjustment of the reference capacitor, the voltage on conductor 40 would ideally be zero; and this condition will be indicated by a null reading on the meter M, when the balance control 90 on the cathodes of the twin triode 88 is correctly adjusted. Any departure from balance between the detector head capacitors, due to variation of thickness of the product P forming the dielectric of the measuring capacitor, will cause a voltage to be transmitted via conductor 40 to the control grid of the first amplifying stage A1 of the output circuit O, and this will be reflected in a D.C. output of the rectifying network 86 which will unbalance the anodes of the twin triode 88 and pass a current through the meter M causing it to deflect approximately proportionately to the degree of unbalance of the detector head capacitors.

In practice, some power loss in the detector head is to be expected, owing to variation in the dielectric loss of the test product. If uncompensated, the small voltage in phase quadrature thus transmitted, via the conductor 40, would cause the meter M not to read null when the detector head capacities were balanced. The compensating network 80 effects the necessary compensation by producing a small voltage, which is of opposite phase to the power loss component and is applied via the conductor 82 to the control grid of the first amplifying stage A1, the amplitude of this compensating voltage being adjustable to bring the reading of meter M exactly to null by means of the movable tapping 86. The tuned circuit 84 serves to compensate the capacity of the screened conductor 82. By slight variation of the tuning of circuit 84 the phase of the compensating voltage can be corrected to exactly 90° with respect to the two equal voltages of opposed phase fed to the detector head through conductors 42 and 44 from the coil 78, and hence to exactly 180° with respect to the power loss voltage. The tuned circuit 84 therefore renders the null correction control 86 entirely independent of the detector head control constituted by the variable reference capacity.

The compensating network above described enables products of varying dielectric loss to be monitored by the detector head.

The (H.T.) D.C. supply of the whole system is derived from a common supply comprising a transformer, a rectifier, a choke and smoothing capacitors (none of which are illustrated as being in accordance with conventional practice); the output of which is fed both to the input circuit I and to the output circuit O through separate neon stabilizer valves and suitable radio frequency decoupling means (again not illustrated as being in accordance with conventional practice) in order to prevent interaction between the input and output circuits.

All the amplifying stages of the input and output circuits I and O are D.C. compensated by high impedance in the cathodes so that the overall gain of the input and output circuits remains unaltered by minor changes of valve characteristic, and heater and D.C. (H.T.) changes. Those skilled in the art will readily appreciate that the gain of the amplifiers A, A1 and A2 which is proportional to their $g_m$'s, is held stable by means of the voltages on their grids and the voltages developed across their cathode resistors (not shown) and that this D.C. stabilization keeps the standing currents through the amplifier valves constant, thus stabilizing their $g_m$'s.

The gain of the output circuit O is controlled by means of a potentiometer network bridged from the D.C. supply to ground and connected to both the amplifying stages A1, A2 to hold their control grids at the same (adjustable) voltage which at full gain, and with supply at 150 v., may be about 30 v.

Stabilization of the overall gain and of the output voltage of the crystal controlled generator G, ensures that if the reference capacitor of the detector head is offset from the null position the reading of meter M will also stay constant over a period of time; and the gain control need only be checked at considerable time-intervals. Any variation of thickness of the product progressing past the plates of the measuring capacitor of the detector head will cause an immediate response of the meter M.

As already stated, provided the cathode balance of the twin-triode 88 is correctly adjusted, the meter M will read null when the detector head capacitors are in balance, but otherwise will give a reading approximately proportional to the degree of unbalance of the detector head capacitors and hence to the variations of thickness of the product P. However, since the rectifying network N is not "phase-conscious," its D.C. output, and consequently the meter reading, will be indifferent to the phase of the detector head output on conductor 40, which depends on which of the two detector head capacitors has the greater capacity; and if the reference capacitor of the detector head is adjusted to give a null reading on the meter with a calibrated, "standard" specimen of the product of correct dimensions in the measuring capacitor, the meter deflections observed during monitoring of a production run of the product will only indicate the extent of dimensional variation of the product, but not whether it is "too thick" or "too thin."

This difficulty can be overcome by deliberately unbalancing the detector head capacitors with the standard specimen in position, so that the meter M gives about half the maximum deflection. On a subsequent test of a production run of the product, a decreased deflection will indicate that the product is too thin and an increased deflection that it is too thick (or conversely, according to whether the detector head is unbalanced by decreasing or increasing the reference capacity); and the scale on the meter may be graduated in plus and minus units of thickness accordingly (and if the scale is so graduated that the minimum thickness limit of the product is to be indicated when the current through the meter is zero, the detector head must be unbalanced—to give zero reading on the meter scale with the standard specimen—by decreasing the reference capacity). It will be evident that when the meter M is graduated in the way just described, its sensitivity will have to be suitably adjusted by adjusting the gain of the amplifying stages A1, A2, in a preliminary setting up process, e.g. with the aid of high- and low-limit standard specimens of the product.

Any appropriate steps may be taken to correct undesirable variation in thickness of the extruded product which, after an initial cooling, passes through the detector head and is then immersed in a further cooling bath prior to being wound on to a storage drum. Normally, a certain degree of tension on the product is applied during the winding, and such tension may be increased if it is found that the extruded product is too thick. The D.C. output of the twin-triode 88 (or of a similar twin-triode paralleled therewith) may be applied to a device operative to effect automatic adjustment of the tension applied to the product after extrusion, or otherwise to bring about automatic compensation by any known method.

In addition to the monitoring of the thickness of continuous tubing, the invention may also be used for monitoring the thickness of continuous rod. Again, the shape of the plates of the measuring capacitor of the detector head may be modified for monitoring products of other than circular cross-section, e.g. as hereinafter described. In all cases, however, it is essential that the product should be presented to the detector plates in a positively guided and constant manner.

In the circuit described a generator frequency of three megacycles per second is referred to, this frequency being particularly suitable having regard to the considerations involved, particularly that of desirable sensitivity. For the same level of amplification obtained with the circuit described, the use of an oscillator frequency lower than three megacycles per second would necessitate an increase in the size of the capacitor plates in the detector head with consequential smaller response to rapid changes of tube dimensions.

An oscillator frequency higher than three magacycles per second may be used when measurement of very small capacities is involved, but the dielectric loss, where materials other than polythene are monitored would be higher. Thus, when it is desired to monitor plastics of poorer insulating quality than that of polythene, it may be found preferable to work at lower rather than higher frequencies and it is possible to operate with frequencies down to 100 kilocycles per second. On the other hand, because of the lower sensitivity, a higher level of amplification must be employed to obtain satisfactory monitoring readings.

[The following description relates to matter not disclosed in the parent specification.]

Figure 5:
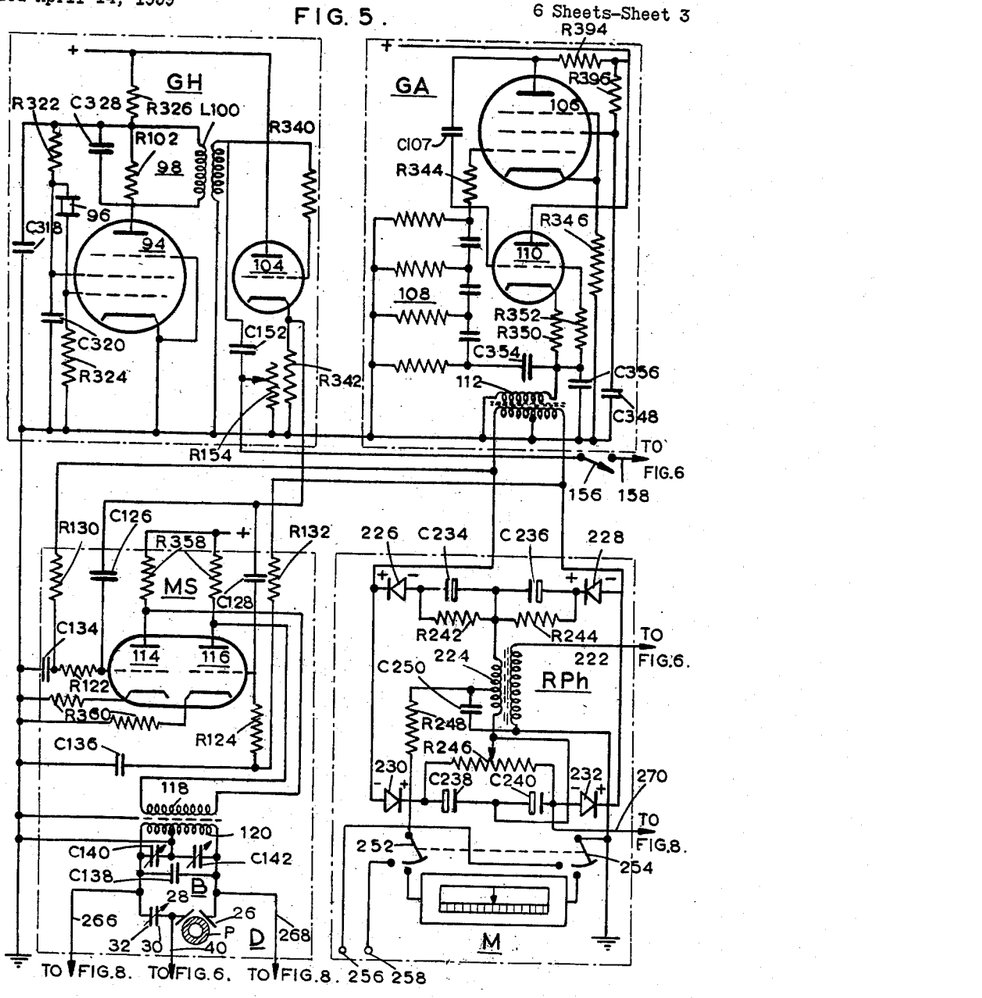
FIGURES 5, 6, 7 and 8 taken together, form a complete circuit diagram comprising a second embodiment of the invention.
Figure 6:
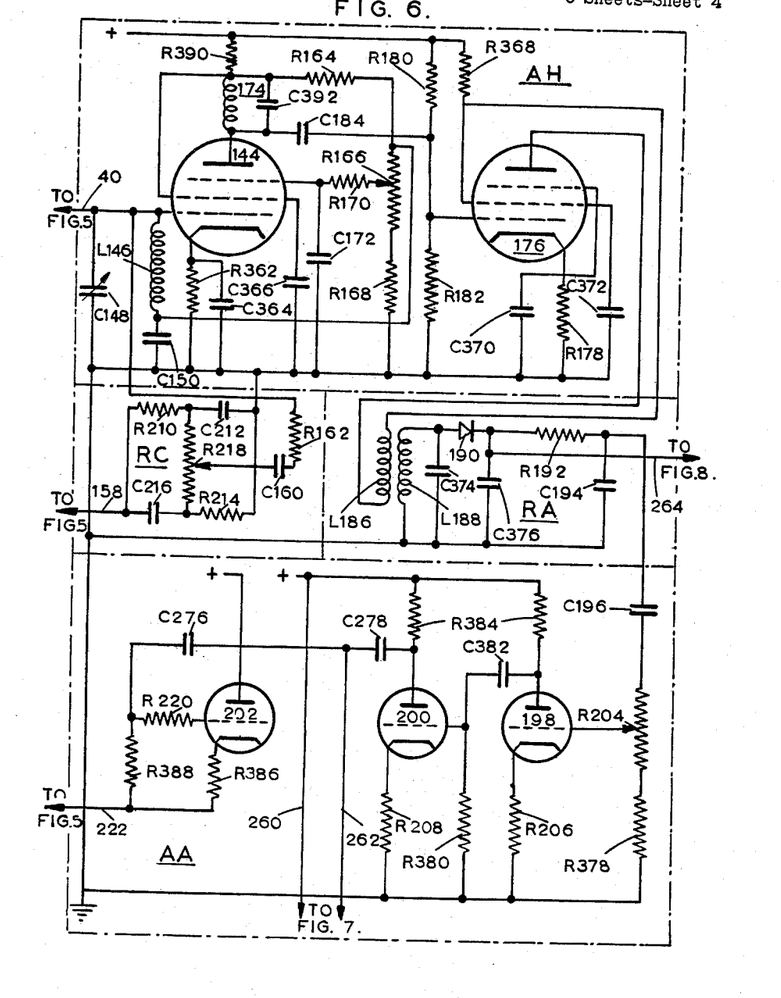
Figure 7:
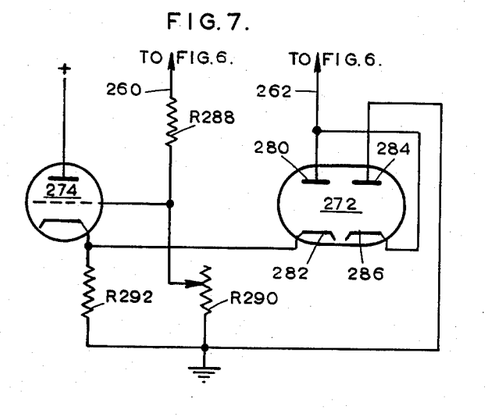
Figure 8:
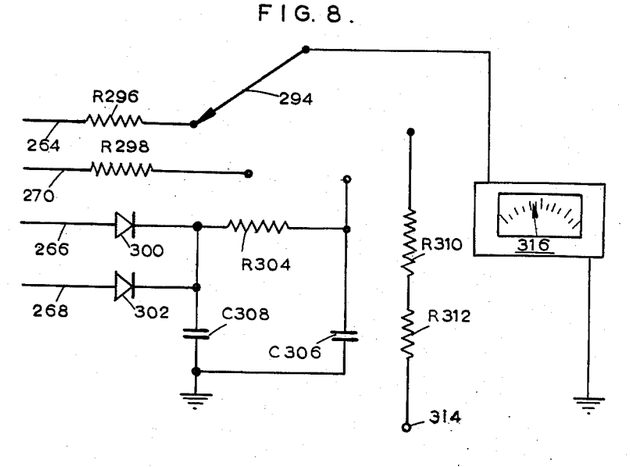

A second circuit arrangement is illustrated by way of example only in FIGURES 5, 6, 7 and 8 of the accompanying drawings, which together constitute the complete circuit diagram of the arrangement. The essential components of the circuit arrangement are illustrated in FIGURES 5 and 6. FIGURES 7 and 8 illustrate preferred, optional additions to the circuit arrangement. Conductors common to different figures are identified (in the respective figures) by the same reference characters.

The circuit arrangement of FIGURES 5 and 6 is similar to that of FIGURE 4 in comprising an input circuit, the detector head and an output circuit. The input circuit includes a radio-frequency generator GH, an audio-frequency generator GA, a balanced modulator and carrier-suppression circuit MS, which feeds the normally balanced bridge circuit B in which the detector head D is connected (see FIGURE 5). The output circuit includes a two-stage, radio-frequency, amplifying circuit AH, a radio-frequency detecting network RA, an audio-frequency amplifying circuit AA (see FIGURE 6) and a phase-sensitive rectifying network RP$h$, in which the "thickness indicating" meter M is connected (see FIGURE 5). The arrangement also includes a reference-carrier wave-phase-correcting network RC, connected between the input and output circuits (see FIGURE 6).

Referring to FIGURES 5 and 6, the radio-frequency generator GH comprises a pentode oscillator 94 controlled by a crystal 96 and oscillating between screen and control grids, the output being taken from a tuned circuit 98 in the anode. The amplitude of the oscillation is kept substantially constant by a self-bias arrangement on the control grid. The output coil L100 in the anode, heavily damped by a resistance R102, is coupled to a cathode follower triode 104, which transforms the relatively high impedance of the output of the crystal oscillator circuit to the relatively low impedance required for feeding the balanced modulator circuit MS hereinafter described.

The audio-frequency generator GA, preferably of about 400 c./s. frequency, comprises a pentode oscillator 106 with a phase-shift network 108 on its control grid, and a triode cathode follower 110, whose grid is connected to the anode of pentode 106 through a capacity C107. Cathode follower 110 feeds a stepdown transformer 112 whose secondary is connected in parallel both to a balanced modulator circuit MS and to the phase-sensitive rectifying network RP$h$, and is balanced about ground so that its output is effectively two voltages of equal amplitude with a phase difference of 180°. The function of the cathode follower 110 is to match the high impedance output of the phase-shift oscillator 106, 108 into the output transformer 112 and to provide the power required for operating the relatively low impedance circuits fed thereby.

The balanced modulator and carrier suppression circuit MS comprises two substantially mutually balanced modulator triodes 114, 116 combined as a twin triode whose grids are both fed with the carrier wave, derived from the radio-frequency cathode follower 104, with the same phase, the modulating oscillation derived from the secondary of the audio-frequency transformer 112 being fed to the respective grids with reversed phases. The output voltages at the anodes of the twin triode 114, 116 are respectively applied to opposite ends of the primary 118 of a transformer 118, 120, the voltage developed across the primary 118 being therefore the difference of the two anode voltages and hence containing only the side-bands, the carrier wave being suppressed.

The twin triode 114, 116 is biased partly by grid current which flows when the grids are driven positive with respect to ground by the carrier wave. The amplitude of the audio-frequency inputs to the twin triode 114, 116 is adjusted by means of resistances R130, R132 to a level at which distortion is not very pronounced; and the amplitude of the output side-bands is maintained reasonably constant owing to the substantially constant amplitude of the radio-frequency and audio-frequency inputs, and to the action of the grid current biasing resistances R122, R124 and capacities C126, C128 which are further so selected that the impedance of the capacities compared with that of the resistances is low at the carrier wave frequency and high at the modulating frequency. This choice produces minimum phase shift of either the radio-frequency or the audio-frequency oscillation between the radio-frequency and audio-frequency generators GH, GA and the modulator grids, and conduces to radio efficiency. High-frequency de-coupling capacitors C134, C136 provide radio-frequency stability.

The transformer secondary 120, which is tuned by a fixed capacity C138 and variable capacities C140, C142 to resonance with the carrier wave, is balanced about ground, so that the voltages appearing at each end of the secondary 120 are side-bands of equal amplitude but of opposite phase. These side-band voltages are fed to the bridge circuit B in which the measuring and reference capacitors 26, 28 and 30, 32 of the detector head D are connected in series, the output from their series-connection being transmitted by the lead 40 to the radio-frequency amplifying circuit AH of the output circuit.

The radio-frequency amplifying circuit AH (see FIGURE 6) has two amplifying stages. The first stage, which includes the principal gain control, comprises a pentode 144 having a tuned circuit L146, C148, C150 at its control grid, which is fed with the detector head output voltage from lead 40 and with the reference carrier wave derived from the grid of the (input) cathode follower 104 via a capacity C152, a potentiometer R154 (FIGURE 5), a switch 156 (FIGURE 5), line 158, the adjustable phase-shift network RC, a capacity 160 and a resistance R162. Switch 156 serves to disconnect the reference carrier wave; and network RC serves to adjust its phase, as hereinafter explained. Consequently, if the circuit L146, C148, C150 goes off tune, the resulting phase change will affect both the received signals equally. The value of resistance R162 is approximately equal to the impedance of the tuned circuit L146, C148, C150 at resonance, so that about half the reference carrier voltage is applied to the control grid of pentode 144.

The control grid of pentode 144 is held at a steady voltage of, say, 30 v., by a potential divider network R164, R166, R168, and gain is controlled by varying the potential on the suppressor grid of pentode 144 by means of the potentiometer R166. The use of a short suppressor grid base enables the anode current to be reduced to zero by biasing the suppressor grid about six volts negative with respect to the cathode. As the suppressor grid potential is varied, the ratio of anode current to screen current varies, but the total current is unaltered. A small self-bias voltage on the suppressor grid, provided by a resistance R170 and capacity C172, prevents much suppressor current from flowing such as would upset operating conditions generally and prevent smooth gain control. In the anode of pentode 144 is a second tuned circuit 174 connected in the usual way, with the screen grid, to the D.C., high-tension supply.

The second radio-frequency amplifying stage comprises a normal pentode 176, stabilized by a cathode resistance R178 and by a potentiometer R180, R182 on its control grid, to which the output from the anode of the first amplifying stage is directly fed through a capacity C184.

The radio-frequency detector network RA consists essentially of a closed circuit, which is coupled to an output coil L186 in the anode of the second radio-frequency amplifying stage 176 by means of a coil L188 tuned to resonance with the carrier frequency and which contains a diode 190. This circuit detects the audio-frequency modulation from the output of the second radio-frequency amplifying stage and transmits a signal of this audio-frequency, via a resistance R192 with a radio-frequency de-coupling capacitor C194 and a capacity coupling C196, to the audio-frequency amplifier AA.

The audio-frequency amplifier AA comprises two triode audio-frequency amplifying stages 198 and 200, each having a gain of preferably about 15, in cascade and a triode cathode follower 202. The audio-frequency signal from the high-frequency detector network is fed to the grid of the first stage triode 198, via a potentiometer R204, by which the overall gain of both audio-frequency amplifying stages 198 and 200 may be adjusted from the maximum value (of about 225) to, preferably, about 100. Both triode amplifying stages 198 and 200 have resistances R206, R208 respectively in their cathodes and are stabilized by A.C. negative feed-back, since they have no cathode de-coupling capacitors. The output from the anode of the second triode amplifying stage 200 is applied to the grid of the triode cathode follower 202.

The network RC comprises parallel branches each containing a resistance R210 or R214 and a capacity C212 or C126 arranged as shown, whose values are such that the resistance and the capacity in each branch have equal impedances at the carrier frequency, so that the phases at the center-tappings of the two branches are shifted relatively to the carrier wave by + and −45° respectively. A potentiometer R218 across the center tappings enables the phase of the reference carrier wave added to the detector head output and fed to the first radio-frequency amplifying stage 144 of the output circuit to be adjusted to any value between 45° advance and 45° retard.

The output from the cathode follower 202, which is provided with a "grid-stopper" resistance R220, is fed via a line 222, to the grounded primary of a step-down, e.g. 5 to 1, transformer 224 (FIGURE 5) whose secondary is connected in the phase-sensitive detector network RPh, to which an audio-frequency oscillation derived from the secondary of transformer 112 is applied as a reference.

The network RPh comprises two parallel rectifying bridges connected across the ends of the secondary of transformer 112. Each of these bridges comprises two diode rectifiers 226, 228 and 230, 232 respectively, directed as shown in the figure, and two equal capacitors C234, C236 and C238, C240 respectively. In bridge 226, 228, the capacitors C234, C236 are respectively paralleled by equal resistances R242, R244 and the center point of the bridge is connected to one end of the secondary of transformer 224, whose other end is connected to the center point of bridge 230, 232, C238, C240 and to the wiper of a potentiometer R246 bridged across both capacitors C238, C240. A center tapping of the secondary of transformer 224 is connected through a resistance R248 to one terminal of the "thickness" meter M and is also grounded through an A.C. de-coupling capacitor C250, the other terminal of meter M being grounded. Ganged switches 252, 254 are provided for switching external terminals 256, 258 into the network RPh, either instead of, or in addition to, the meter M, for connection of automatic apparatus for controlling production of the test product as previously mentioned.

Each bridge 226, C234, C236, 228 and 230, C238, C240, 232 is subjected to an audio-frequency reference voltage derived from the secondary of transformer 112, whose center-tapping is grounded, so that the peak voltages are equal and respectively positive and negative with respect to ground. Each of these bridges is in effect composed of two, equivalent, half-wave rectifier circuits, both of whose diodes conduct in the same half-wave; but the diodes 226, 228 conduct during one half-wave and diodes 230, 232 conduct during the other half-wave. Now, so long as there is no output (on line 40, FIGURE 5) from the detector head, there will be no input (on line 222) to the primary of transformer 224; in which case, due to the equality of the capacitors C234, C236 and C238, C240 respectively, the central tappings of both bridges will be at ground potential, because during the half-cycle when diodes 226, 228 conduct, equal and opposite voltages (relative to ground) will be built-up on capacitors C234, C236, and similarly, on capacitors C238, C240, during the half-cycle when diodes 230, 232 conduct.

If now an "error signal," in the form of an audio-frequency voltage, derived, after amplification and radio-frequency detection by circuits AH, RA and AA from the output of the detector head on line 40 (FIGURE 6) is applied to the primary of transformer 224, the secondary of this transformer will apply alternating voltages, of the same frequency as the audio-frequency reference voltage above-mentioned, but of opposite phase, to the center tappings of bridges 226, C234, C236, 228 and 230, C238, C240, 232 respectively.

If such an alternating "error" voltage is applied to the junction of capacitors C234, C236 in phase with the reference voltage, i.e. so that the error voltage is +ve on the junction of capacitors C234, C236 when the voltage applied to diode 228 is +ve; then, during the half cycle when diodes 226, 228 conduct this error voltage will oppose the reference voltage across the capacitor C236 and add to that across capacitor C234, so that these capacitors will be charged, positively and negatively respectively, to voltages differing approximately by the peak-to-peak voltage of the error signal, and consequently a −ve D.C.

voltage equal to this difference will be developed on the junction of capacitors C234, C236. Similarly during the other half-cycle an equal D.C. voltage will be developed on the junction of capacitors C238, C240, and this latter voltage will be of the same polarity as that developed on the junction of capacitors C234, C236, because the direction of the diodes 230, 232 is reversed relatively to that of diodes 226, 228. Consequently, an approximately constant D.C. output is obtained from the center tapping of the secondary of transformer 224 (which, as already mentioned, is A.C. de-coupled) responsive and substantially proportional to the amplitude of the error signal voltage applied to the circuit RP$h$ from line 222. Moreover, the sign ($+$ or $-$) of the D.C. voltage developed at the center tapping of the secondary of transformer 224, and consequently the sense in which the "thickness" meter M is deflected from zero, will depend on which of the two oppositely phased reference voltages transmitted from the secondary of transformer 112 to the circuit RP$h$ is in phase (or antiphase) with the error signal voltage applied to the primary of transformer 224.

If the error signal voltage on the transformer 224 includes a component in quadrature with the reference voltage, such quadrature component will not affect the steady outputs from the center tappings of the two rectifying bridges; since during the half cycle when diodes 226, 228 conduct, the quadrature component will, during the first quarter cycle, build up on capacitors C234, C236 unequal voltages whose difference is equal and opposite to that of the unequal voltages so built up on the same capacitors during the second quarter cycle, so that the mean D.C. voltage appearing on the center tapping of the bridge 226, C234, C236, 228 over the whole half-cycle will be nil. Similarly, during the second half-cycle the mean D.C. voltage appearing on the center tapping of the bridge 230, C238, C240, 232 (as a result of the quadrature component of the error signal) will likewise be nil.

The potentiometer R346 enables any fortuitous variations of the characteristics of the diodes 226, 228, 230, 232 to be compensated.

The duplication of the rectifying bridges 226—228 and 230—232 serves, firstly to ensure full-wave rectification, and, secondly a correctly balanced D.C. output to the meter M (or/and terminals 256, 258); and the use in each such bridge of two balanced rectifying diodes (226, 228 or 230, 232) and two balanced capacitors (C234, C236 or C238, C240) with center tappings to the output secondary of transformer 224, serves to ensure that the D.C. output voltage on the secondary of transformer 224, for a given amplitude of error signal voltage on the primary of transformer 224, is the same (but with different sign) whichever of the two opposed-phase reference voltages, derived from transformer 112, is in phase with the error signal voltage. In other words the system is fully (and automatically) balanced.

The additional circuits illustrated in FIGURES 7 and 8 are optional, but the "checking" meter 316 of FIGURE 8 (vide infra) will usually be included, even if the other elements illustrated in FIGURE 8 (and hereinafter described) are omitted.

FIGURE 7 illustrates a "thickness" meter protection circuit, the aim of which is automatically to prevent the thickness meter M from being overloaded. It comprises a double diode tube 272 and a triode 274. The grid of triode 274 is connected through a resistance 288 and line 260 to the D.C., H.T. supply of triodes 198, 200 (see also FIGURE 6) and is grounded through a potentiometer R290. The cathode of triode 274 is grounded through a resistance R292. The line 262 connects the junction between the capacitors C276, C278 in the connection between the anode of the audio-frequency second stage amplifying triode 200 and the grid of the cathode follower 202 (see FIGURE 6) with the anode 280 of one of the twin diodes of tube 272 and with the cathode 286 of the other twin diode of tube 272. The cathode 282 of tube 272, corresponding to anode 280, is connected to the cathode of triode 274, and the anode 284 of tube 272 is grounded.

The circuit of FIGURE 7 operates as follows:

The twin diode 272 clips the top and bottom of the wave form of the error signal voltage as soon as its peak-to-peak amplitude exceeds the voltage at the cathode of triode 274, which acts as a cathode follower to maintain the limiting peak-to-peak voltage of the error signal constant as and when the diodes 272 start to pass current and thus clip the error signal voltage wave form.

FIGURE 8 illustrates additional optional circuits introduced for checking and setting up purposes. They comprise a checking switch 294 whose movable contact is connected to a "checking" meter 316 and which has four positions. The first fixed contact is connected through a resistance 296, via a line 264 (see also FIGURE 6) to the radio-frequency detector network RA. When switched on to this first fixed contact the checking meter indicates the amplitude of carrier voltage present in normal operation and thus acts as a principal output circuit gain indicator. It can also be used for tuning purposes in setting up the apparatus and as an internal check meter in the event of a fault. Although stated as "optional," the check meter (connected to the network RA) is in practice almost essential, and when the apparatus is in use it is desirable to leave the check meter so connected as it then acts as a guide to the sensitivity of the apparatus, its reading falling approximately linearly with sensitivity.

The second fixed contact of switch 294 is connected, via a resistance 298 and line 270 (see also FIGURE 5) to the potentiometer R246 (FIGURE 6). When switched on to this contact the checking meter will indicate the amplitude of oscillation at the audio-frequency generator GA.

The third fixed contact of the switch 294 is connected, through a resistance R304, to a pair of germanium diodes 300, 302 connected, via lines 266, 268 (see also FIGURE 5) to opposite sides of the bridge circuit B (FIGURE 5) the switch contact and diodes being grounded through A.C. de-coupling capacities C306, C308. When switched on to this third contact, the checking meter 316 indicates the amplitude of the output voltage from the detector head D on line 40.

The fourth fixed contact of the switch 294 is connected to a plug socket 314, through a high resistance R310 and a low resistance R312 which convert the meter 316 in effect into a voltmeter; and a lead from socket 314 can be taken to any point of the apparatus to check whether it is correctly energized.

The (H.T.) D.C. supply of the system is derived in the same way as that of the embodiment described with reference to FIGURE 4 with neon stabilizer valves and radio frequency de-coupling means, the (H.T.) D.C. supply of the radio-frequency generator GH and of the modulator circuit MS being stabilized separately from that of the audio-frequency generator GA and the output radio-frequency and audio-frequency amplifying circuits AH and AA.

Suitable values of resistance and capacities for the circuit arrangement of FIGURES 5 to 8, when designed for monitoring plastic tube, are set out in a table, which, being by way of an appendix, will be found at the end of this specification.

FIGURES 9 to 14 illustrate diagrammatically various modified arrangements of measuring capacitor plates for monitoring dimensional inaccuracies of different types of elongated product.

Referring to FIGURES 9 to 14, in each of FIGURES 9 to 13 the capacitor plates are designated by $a$ and $b$ and the product by $c$. The electrostatic fields are indicated by dotted lines.

Figure 9:
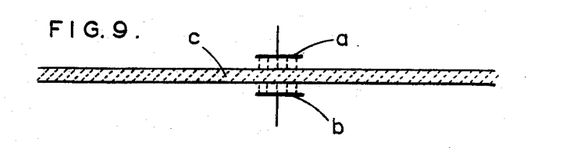
FIGURES 9–14 inclusive comprise diagrammatic illustrations of various modified arrangements for measuring capacitor plates for monitoring dimensional inaccuracies of different types of elongated product.
Figure 10:
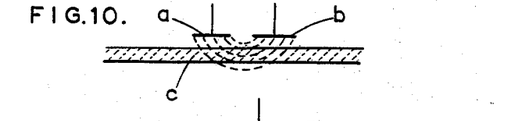
Figure 11:
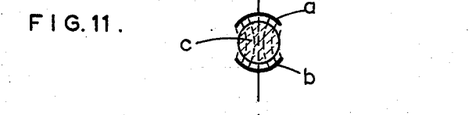

In the arrangements of FIGURES 9 and 10, the test product is in the form of sheet or strip. In FIGURE 11 it is a solid rod of round cross-section; and in FIGURES 12 and 13 it is a cylindrical tube.

Figure 12:
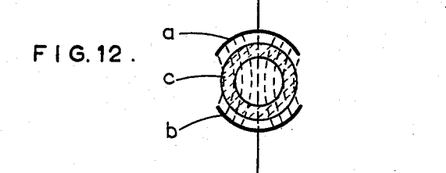

[In FIGURES 11 and 12 the capacitor plates the shaped and arranged as in the detector head disclosed in the parent specification.]

Figure 13:
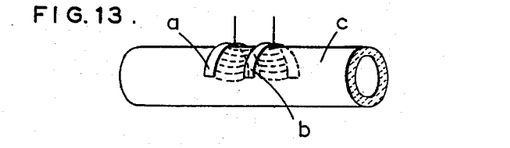

In the arrangements of FIGURES 10 and 13 both plates of the measuring capacitor can be mounted in the same half of the screening box so that no electrical connections need be led into the other half of the box.

Figure 14:
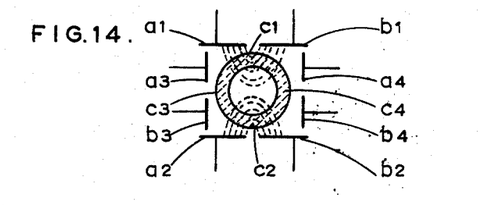

In FIGURE 14, a tubular product furnishes the dielectric of two capacitors, whose plates $a1$, $b1$ and $a2$, $b2$ respectively are arranged so that their electrostatic fields are concentrated over limited regions $c1$, $c2$ of the tubular product situated diametrically opposite each other. In this case the capacities of the two capacitors will differ if the bore of the tube is eccentric in the diametral plane $c1$, $c2$; and such eccentricity can be determined by determining the difference of the two capacities. Eccentricity in the diametral plane perpendicular to $c1$, $c2$ can likewise be determined either by effecting a relative rotation of the tube and the plates through 90°, or by using a second pair of similar capacitors $a3$, $b3$ and $a4$, $b4$ with their gaps disposed, as shown in dotted lines, in such perpendicular plane. The planes in question are indicated by chain-dotted lines.

Table
FIGURE 5

| Resistances | | Capacities | |
| --- | --- | --- | --- |
| R322 | 10 KΩ | C318 | 0.1 μf. |
| R324 | 47 KΩ | C320, C328 | 100 pf. |
| R326 | 1 KΩ | C152 | 10 pf. |
| R102 | 1.5 KΩ | C348 | 0.1 μf. |
| R154 | 250 | | |
| R340, R342 each | 1 KΩ | | |
| R344 | 120 KΩ | | |
| Network 108, four resistances, each. | 150 KΩ | Network 108, three capacities, each. | 0.002 μf. |
| R394 | 27 KΩ | C354 | 0.002 μf. |
| R396 | 56 KΩ | C356 | 0.1 μf. |
| R346 | 330 Ω | C126, C128, each | 100 pf. |
| R350 | 220 Ω | C134, C136, each | 470 pf. |
| R352 | 180 KΩ | C140, C142, each | 100 pf. |
| R130, R132, each | 2.2 KΩ | C138 | 75 pf. |
| R358 each | 6.8 KΩ | C234, C236, C238, C240, each. | 2 μf. |
| R360 each | 220 Ω | | |
| R122, R124, each | 47 KΩ | | |
| R242, R244, each | 2.2 KΩ | C250 | 1 μf. |
| R246 | 5 KΩ | C107 | 0.1 μf. |
| R248 (for Max. output of 1 ma.). | 1 KΩ | | |

FIGURE 6

| | | | |
| --- | --- | --- | --- |
| R390 | 1 KΩ | C150 | 0.1 μf. |
| R164 | 120 KΩ | C392 | 100 pf. |
| R166 | 10 KΩ | C364, C366, each | 0.1 μf. |
| R168 | 27 KΩ | C172 | 0.03 μf. |
| R170 | 1 MΩ | C184 | 1,000 pf. |
| R362 | 6.8 KΩ | C370, C372, each | 0.1 μf. |
| R180 | 2.2 MΩ | C212, C216, each | 500 pf. |
| R182 | 470 KΩ | C160 | 1,000 pf. |
| R368 | 1 KΩ | C374 | 150 pf. |
| R178 | 3.3 KΩ | C376 | 300 pf. |
| R162 | 33 KΩ | C194 | 1,000 pf. |
| R210, R214, each | 100 Ω | C196, C382, C276, C278, each. | 0.1 μf. |
| R218 | 5 KΩ | | |
| R192 | 3.3 KΩ | | |
| R204 | 100 KΩ | | |
| R378 | 27 KΩ | | |
| R206, R208 each | 2.2 KΩ | | |
| R380 | 1 MΩ | | |
| R384 each | 100 KΩ | | |
| R220 | 100 KΩ | | |
| R386 | 220 Ω | | |
| R388 | 1 MΩ | | |

FIGURE 7

| | |
| --- | --- |
| R288 | 180 KΩ |
| R290 | 50 KΩ |
| R292 | 6.8 KΩ |

FIGURE 8

| | | | |
| --- | --- | --- | --- |
| R296 | 4.7 KΩ | C308 | 1,000 pf. |
| R298 | 22 KΩ | C306 | 0.03 μf. |
| R304 | 2.2 KΩ | | |
| R310 | 470 KΩ | | |
| R312 | 27 KΩ | | |

I claim:

1. Apparatus for detecting transverse dimensional variations of an elongated dielectric product, e.g. extruded polythene tubing, comprising an input circuit, a detector circuit, and an output circuit; said input circuit including a crystal-controlled oscillation generator of radio-frequency, i.e. at least 100 kc., an audio-frequency oscillation generator, a balanced modulator and carrier-suppression circuit receiving the outputs of said radio-frequency and audio-frequency generators and modulating the former by the latter of them and suppressing the radio-frequency carrier wave, and a transistor in the output of said modulator circuit; said detector circuit comprising, together with the secondary of said transformer, a grounded center tapping on said secondary, at least one tuning capacitor connected across the ends of said transformer-secondary, and two other capacitors, viz. a measuring capacitor and a pre-settable, variable reference capacitor connected in series across the ends of said transformer-secondary; said detector circuit thereby constituting a single bridge circuit, which is tunable to resonance with the carrier frequency of said input circuit and the amplitude and phase of whose output at the series-connection between the measuring and reference capacitors respectively vary according to the degree and algebraic sign of capacity unbalance, if any, of the measuring and reference capacitors; means, including a phase-correcting network, for transferring the carrier wave generated by said radio-frequency generator to said output circuit, as a reference; said output circuit comprising a radio-frequency amplifying circuit having a gain control and receiving the detector circuit output from said series-connection and said reference carrier wave, a radio-frequency detecting network receiving the output of said radio-frequency amplifying circuit and transmitting an audio-frequency signal whose amplitude and phase respectively represent those of the detector circuit output, an audio-frequency amplifying circuit, and a phase-sensitive rectifying circuit receiving the output of said audio-frequency amplifying circuit and an audio-frequency reference wave derived directly from the audio-frequency generator of the input circuit and transmitting a direct current whose magnitude represents the amplitude and whose algebraic sign represents the phase of the detector circuit output; the apparatus further including a portable detector head comprising a screening-box containing said measuring and reference capacitors and manually adjustable means for varying the capacity of the reference capacitor, said box having alined openings through which the elongated product can be progressed, and the measuring capacitor having plates so disposed in said box that its principal electrostatic field is traversed by part at least of the cross-section of said product; together with external, flexible, screened leads connected respectively to said measuring and reference capacitors and the series-connection between them and thus forming parts of the detector and output circuits.

2. The apparatus set forth in claim 1 in which the frequency of the crystal-controlled radio frequency oscillation generator is of the order of 3 mc.

3. Apparatus as set forth in claim 1, in which said audio frequency amplifying circuit includes two amplifying stages in cascade with a supplementary gain control and a cathode follower.

4. Apparatus as set forth in claim 1, in which the audio-frequency amplifying circuit includes a protective circuit comprising a double diode tube having reversed diodes and a cathode follower, the double diode being operative to clip the peaks of the output of the audio-frequency amplifying circuit when the peak-to-peak voltage thereof attains the cathode voltage on the said cathode follower and at the same time to hold said cathode voltage constant.

5. Apparatus as set forth in claim 1, including further a checking meter connectible to said radio-frequency detecting network, together with radio-frequency decoupling means for said checking meter.

6. Apparatus as set forth in claim 5, including further a full-wave rectifying circuit connected across said bridge circuit, and a checking switch for selectively connecting said checking meter to said radio-frequency detecting network, to said full-wave rectifying circuit and to said phase-sensitive rectifying circuit.

7. Apparatus as set forth in claim 1, in which the said phase-sensitive rectifying circuit comprises two circuits bridged across the output of the audio-frequency generator of the input circuit, each such bridging circuit having two diode half-wave rectifiers in series with their diodes directed the same way, and the diodes of one bridging circuit being directed oppositely to those of the other such circuit, means for applying the output of the audio-frequency amplifying circuit (of the output circuit) to the junctions of the half-wave rectifiers of the two said bridging circuits and means common to both said junctions for taking direct current therefrom.

8. A portable detector head assembly for detecting, in association with a radio-frequency generating circuit producing two equal antiphased voltages and an amplifying receptor circuit including indicator means, transverse dimensional variations of an elongated, e.g. tubular, product of dielectric material; said assembly comprising a screening-box having mutually alined openings in opposite walls thereof for admitting said product; and disposed in said box a first or measuring capacitor composed of two plates shaped and positioned with respect to said openings so that part at least of the cross-section of said product, when admitted through said openings, lies within the principal electrostatic field and so constitutes part at least of the dielectric of said measuring capacitor; a second, variable capacitor comprising two fixed plates and a displaceable member whose position determines the capacity of said variable capacitor; and a series electrical connection between said capacitors; three external electrical connectors, the first and second of which are respectively connected to those plates which are not electrically interconnected, of said two capacitors, the third being connected to said series-connection, and external means, e.g. a knob, operatively connected to said displaceable member for displacing the same; said screening-box being made in two parts hinged to one another and the parting between said two parts intersecting both said openings, the displaceable member of the variable capacitor being a grounded conductive "trimmer" plate, displacement of which variably shields the plates of the variable capacitor, and the measuring and variable capacitors being both accommodated in the same part of the screening-box.

References Cited in the file of this patent

Hellman: "Modulator Bridge," Electronics, March 1938.

Cook: "Measuring Minute Capacitance Changes," Electronics, January 1953; pages 105–107.

Jacobson: "Method for Obtaining Streaming Orientation and Simultaneous Determination of Dielectric Properties in Macromolecular Solutions," The Review of Scientific Instruments, volume 24, No. 10, October 1953; pages 949–954.